US012623595B2

(12) United States Patent
Bastyr et al.

(10) Patent No.: US 12,623,595 B2
(45) Date of Patent: May 12, 2026

(54) DRIVE MODE OPTIMIZED ENGINE ORDER CANCELLATION

(71) Applicant: Harman International Industries, Incorporated, Stamford, CT (US)

(72) Inventors: Kevin J. Bastyr, Franklin, MI (US); Antonio Gomez, Hazel Park, MI (US); Aditya Kumar, Northville, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 1028 days.

(21) Appl. No.: 16/898,637

(22) Filed: Jun. 11, 2020

(65) Prior Publication Data

US 2021/0001769 A1 Jan. 7, 2021

Related U.S. Application Data

(60) Provisional application No. 62/869,247, filed on Jul. 1, 2019.

(51) Int. Cl.
*B60Q 5/00* (2006.01)
*B60W 30/14* (2006.01)
(Continued)

(52) U.S. Cl.
CPC ........... *B60Q 5/005* (2013.01); *B60W 30/143* (2013.01); *B60W 30/18009* (2013.01); *B60W 30/19* (2013.01); *B60W 2420/54* (2013.01)

(58) Field of Classification Search
CPC ................ B60Q 5/005; B60W 30/143; B60W 30/18009; B60W 30/19; B60W 2420/54;
(Continued)

(56) References Cited

U.S. PATENT DOCUMENTS 5,222,148 A * 6/1993 Yuan ........................ F01N 1/065
381/71.9
5,386,472 A * 1/1995 Pfaff ................ G10K 11/17881
381/71.12
(Continued)

FOREIGN PATENT DOCUMENTS

CN 105593928 A 5/2016
CN 108140376 A 6/2018
(Continued)

OTHER PUBLICATIONS

Extended European Search Report of European application No. 20182620.3 dated Mar. 24, 2021, 22 pages.
(Continued)

*Primary Examiner* — Scott A Reinbold
(74) *Attorney, Agent, or Firm* — BROOKS KUSHMAN P.C.

(57) ABSTRACT

Engine order cancellation (EOC) systems generate feed forward noise signals based on the engine or other rotating shaft RPM and use those signals and adaptively configured W-filters to reduce the in-cabin SPL by radiating anti-noise through speakers. An EOC system may include a drive mode detector for detecting different vehicle drive modes based on an analysis of signals indicative of current vehicle operating conditions. Upon detection, the EOC system may adaptively adjust various tuning parameters for the EOC algorithm based on the current vehicle drive mode. The EOC system may also selectively target different sets of engine orders for noise cancellation according to the current vehicle drive mode based on which engine orders are dominant during that drive mode.

21 Claims, 4 Drawing Sheets

(51) Int. Cl.
B60W 30/18 (2012.01)
B60W 30/19 (2012.01)

(58) Field of Classification Search
CPC ..... G10K 2210/503; G10K 2210/3053; G10K
2210/3054; G10K 2210/3055; G10K
2210/3056; G10K 2210/511; G10K
2210/3032; G10K 2210/3011; G10K
2210/3027; G10K 2210/1282; G10K
2210/128; G10K 11/17883; G10K
11/17854; G10K 11/1783
USPC .......................................................... 701/36
See application file for complete search history.

(56) References Cited

U.S. PATENT DOCUMENTS

| | | | | |
|---|---|---|---|---|
| 5,493,616 A * | 2/1996 | Iidaka | .............. | G10K 11/17854 |
| | | | | 381/71.4 |
| 5,680,075 A | 10/1997 | Sacca | | |
| 5,692,052 A | 11/1997 | Tanaka et al. | | |
| 2004/0086135 A1* | 5/2004 | Vaishya | ........... | G10K 11/17853 |
| | | | | 381/86 |
| 2006/0269078 A1* | 11/2006 | Sakamoto | .......... | G10K 11/1783 |
| | | | | 381/71.1 |
| 2008/0240456 A1* | 10/2008 | Sakamoto | ........ | G10K 11/17854 |
| | | | | 381/71.4 |
| 2010/0266135 A1 | 10/2010 | Theobald et al. | | |
| 2012/0257763 A1* | 10/2012 | Bowden | ........... | G10K 11/17823 |
| | | | | 381/71.4 |
| 2015/0010163 A1 | 1/2015 | Ganeshkumar et al. | | |
| 2015/0117670 A1* | 4/2015 | Lee | ........................ | G10K 15/02 |
| | | | | 381/86 |
| 2016/0102620 A1* | 4/2016 | Ervin | ........................ | F01L 1/34 |
| | | | | 123/345 |
| 2017/0110108 A1 | 4/2017 | Christoph et al. | | |
| 2017/0234180 A1 | 8/2017 | Petley et al. | | |
| 2018/0190258 A1* | 7/2018 | Mohammad | ............ | G10L 15/02 |
| 2021/0104215 A1* | 4/2021 | Valeri | .................. | G10K 11/178 |

FOREIGN PATENT DOCUMENTS

| | | | | |
|---|---|---|---|---|
| CN | 108470562 A | 8/2018 | | |
| DE | 4333384 A1 | 3/1994 | | |
| EP | 0479367 A2 | 4/1992 | | |
| EP | 578202 A2 * | 1/1994 | .............. | B60K 5/12 |
| EP | 3748628 A1 | 12/2020 | | |
| JP | H07230289 A | 8/1995 | | |
| JP | H08339192 A | 12/1996 | | |
| JP | 2006327540 A * | 12/2006 | .......... | G10K 11/178 |
| JP | 2011141118 A | 7/2011 | | |
| JP | 5005765 B2 | 8/2012 | | |
| JP | 5798665 B2 | 10/2015 | | |
| JP | 6074693 B2 | 2/2017 | | |
| JP | 2018078641 A | 5/2018 | | |
| KR | 20120062527 A | 6/2012 | | |
| WO | 2017188133 A1 | 11/2017 | | |

OTHER PUBLICATIONS

Communication pursuant to Article 94(3) EPC of European application No. 20182620.3 dated Sep. 2, 2022, 7 pages.
Communication pursuant to Article 94(3) EPC of European patent application No. 20182620.3 dated Nov. 9, 2023, 10 pages.
Notice of Reasons of Refusal of Japanese Patent Application No. 2020-108528 dated Jul. 23, 2024, 8 pages.
Office Action of Chinese patent application No. 202010624579.4 dated Jan. 21, 2025, 16 pages.
Office Action of Korean Patent Application No. 10-2020-0076709 dated Mar. 11, 2025, 23 pages.
Notice of Grant of Invention Patent Right of Chinese patent application No. 202010624579.4 dated Sep. 23, 2025, 11 pages.

* cited by examiner

*100*
*P(z)*
*112*  *114*  *102*
*108*  *110*  *124*
*116*
*Y (n)*  *e (n)*
*X (n)*
W (z)  *118*
S'(z)  →  LMS
*122*  *120*  *104*
Local Processor  *128*
Local Storage  *130*
<u>FIG. 1</u>
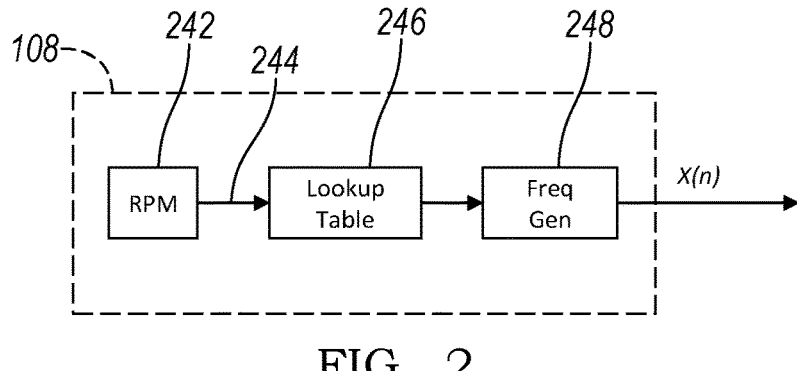
*242*  *244*  *246*  *248*
*108*
RPM → Lookup Table → Freq Gen  → *X(n)*
<u>FIG. 2</u>

| | LEAKAGE | STEP SIZE | STABILITY SPL THRESHOLD | ANTI-NOISE SIGNAL Y(n) GAIN |
|---|---|---|---|---|
| WOT | HIGH | HIGH | HIGH | HIGH |
| POT | MEDIUM | MEDIUM | HIGH | MEDIUM |
| TOWING | HIGH | MEDIUM | HIGH | HIGH |
| CONSTANT SPEED | LOW | LOW | LOW | LOW |
| CYLINDER DEACTIVATION | LOW | LOW | HIGH | HIGH |
| COAST DOWN | MEDIUM | HIGH | LOW | HIGH |
| IDLE | LOW | LOW | LOW | LOW |

*800*

| | DOMINANT ORDERS |
|---|---|
| WOT | 2, 2.5, 4, 4.5, 6 |
| POT | 2, 2.5, 4, 4.5, 6 |
| TOWING | 2, 2.5, 4, 4.5, 6 |
| CONSTANT SPEED | 2, 2.5, 4, 4.5, 6 |
| CYLINDER DEACTIVATION | 2, 2.5, 4, 4.5, 6 |
| COAST DOWN | 2, 2.5, 4, 4.5, 6 |
| IDLE | 2.5, 4, 4.5, 6, 6.5 |

DRIVE MODE OPTIMIZED ENGINE ORDER CANCELLATION

CROSS-REFERENCE TO RELATED APPLICATIONS

This application claims the benefit of U.S. provisional Application No. 62/869,247 filed Jul. 1, 2019, the disclosure of which is hereby incorporated in its entirety by reference herein

TECHNICAL FIELD

The present disclosure is directed to engine order cancellation and, more particularly, to optimizing engine order cancellation and corresponding tuning parameters based on a detected vehicle drive mode.

BACKGROUND

Active Noise Control (ANC) systems attenuate undesired noise using feedforward and feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, combine to reduce the sound pressure level (SPL) at a location. In a vehicle cabin listening environment, potential sources of undesired noise come from the engine, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

An Engine Order Cancellation (EOC) system is a specific ANC system implemented on a vehicle to reduce the level of unwanted vehicle interior noise originating from the narrow band acoustic and vibrational emissions from the vehicle engine and exhaust system or other rotating drivetrain components. EOC systems generate feed forward noise signals based on the engine or other rotating shaft angular speeds, such as revolutions per minute (RPM), and use those signals and adaptively configured W-filters to reduce the in-cabin SPL by radiating anti-noise through speakers.

EOC systems are typically Least Mean Square (LMS) adaptive feed-forward systems that continuously adapt W-filters based on both an RPM input from a sensor mounted to the drive shaft and on signals of microphones located in various positions inside the vehicle's cabin. When tuning EOC systems, engineers begin with a single wide-open throttle (WOT) data run. Looking at the sound measured at the occupants' ears versus RPM, the dominant engine orders are identified. For each engine order, a single value for each of the main EOC algorithm parameters is identified. These EOC algorithm parameters typically include step size, stability SPL threshold, leakage, gain, and the like.

SUMMARY

Various aspects of the present disclosure relate to optimizing engine order cancellation (EOC) parameters in an EOC system based on a current vehicle drive mode. In one or more illustrative embodiments, a method for dynamically tuning an EOC system based on vehicle drive mode is provided. The method may include the following steps: storing a set of EOC tuning parameters for each of a plurality of vehicle drive modes in memory, each set of EOC tuning parameters differing between vehicle drive modes; applying a first set of EOC tuning parameters corresponding to a current vehicle drive mode; receiving at least one signal indicative of vehicle operating conditions; detecting a change in the current vehicle drive mode based on the at least one signal; and applying a second set of EOC tuning parameters in response to the change in the current vehicle drive mode.

Implementations may include one or more of the following features. The step of applying a first set of EOC tuning parameters corresponding to the current vehicle drive mode may include: selecting the first set of EOC tuning parameters corresponding to a first vehicle drive mode from memory when the first vehicle drive mode is the current vehicle drive mode; and employing the first set of EOC tuning parameters. Further, the step of applying a second set of EOC tuning parameters in response to the change in current vehicle drive mode may include: selecting the second set of EOC tuning parameters corresponding to a second vehicle drive mode from memory in response to the change in current vehicle drive mode from the first vehicle drive mode to the second vehicle drive mode; and employing the second set of EOC tuning parameters during EOC when the current vehicle drive is the second vehicle drive mode.

The set of EOC tuning parameters for each of the plurality of vehicle drive modes may include at least a step size, a leakage value, a gain applied to one of an anti-noise signal and a noise signal, or a sound pressure level threshold applied to an error signal. The signal indicative of vehicle operating conditions may be indicative of cruise control engagement. Alternatively, the signal indicative of vehicle operating conditions may be indicative of at least one of revolutions per minute (RPM), speed, and torque. Thus, detecting the change in the current vehicle drive mode based on the at least one signal may comprise: determining a rate of change of at least one of RPM, speed, and torque; and comparing the rate of change to one or more predetermined thresholds.

The plurality of vehicle drive modes may include at least a partially open throttle drive mode and a constant speed drive mode. The plurality of vehicle drive modes may further include a wide open throttle drive mode.

One or more additional embodiments of the present disclosure are directed to an engine order cancellation (EOC) system. The EOC system may include at least one controllable filter configured to generate an anti-noise signal based on an adaptive transfer characteristic and a noise signal received from a noise signal generator. The adaptive transfer characteristic of the at least one controllable filter may be characterized by a set of filter coefficients. The EOC system may further include an adaptive filter controller, including a processor and memory, programmed to: store a set of EOC tuning parameters for each of a plurality of vehicle drive modes, each set of EOC tuning parameters differing between vehicle drive modes; apply the set of EOC tuning parameters corresponding to a current vehicle drive mode; and adapt the set of filter coefficients based on the noise signal and an error signal received from a microphone located in a cabin of a vehicle. The EOC system may also include a drive mode detector in communication with at least the adaptive filter controller. The drive mode detector may include a processor and memory programmed to: receive at least one signal indicative of vehicle operating conditions; analyze the at least one signal to determine the current vehicle drive mode; and transmit a drive mode signal indicative of the current vehicle drive mode to the adaptive filter controller.

Implementations may include one or more of the following features. The drive mode detector may transmit the drive mode signal in response to detecting a change in the current vehicle drive mode. The set of EOC tuning parameters for each of the plurality of vehicle drive modes may include at least one of a step size and a leakage value. The plurality of vehicle drive modes may include at least a partially open throttle drive mode and a constant speed drive mode. The at least one signal indicative of vehicle operating conditions may be indicative of at least one of revolutions per minute (RPM), speed, and torque. The at least one signal indicative of vehicle operating conditions may be indicative of transmission gear state.

One or more additional embodiments of the present disclosure are directed to a method for dynamically targeting dominant engine orders for active noise cancellation in an engine order cancellation (EOC) system based on vehicle drive mode. The method may include: storing a set of dominant engine orders for each of a plurality of vehicle drive modes, each set of dominant engine orders differing between vehicle drive modes; receiving at least one signal indicative of vehicle operating conditions; detecting a current vehicle drive mode based on the at least one signal; selecting the set of dominant engine orders corresponding to the current vehicle drive mode; and applying noise cancellation to each engine order in the set of dominant engine orders corresponding to the current vehicle drive mode.

Implementations may include one or more of the following features. The method may further include selecting a different set of dominant engine orders in response to detecting a change in the current vehicle drive mode. Each of the plurality of vehicle drive modes may correspond to a different state of a vehicle transmission.

BRIEF DESCRIPTION OF THE DRAWINGS

FIG. 1 is a block diagram of a vehicle having an engine order cancellation (EOC) system, in accordance with one or more embodiments of the present disclosure;

FIG. 2 is a detailed view of a noise signal generator depicted in FIG. 1, in accordance with one or more embodiments of the present disclosure;

DETAILED DESCRIPTION

Figures 3, 4:
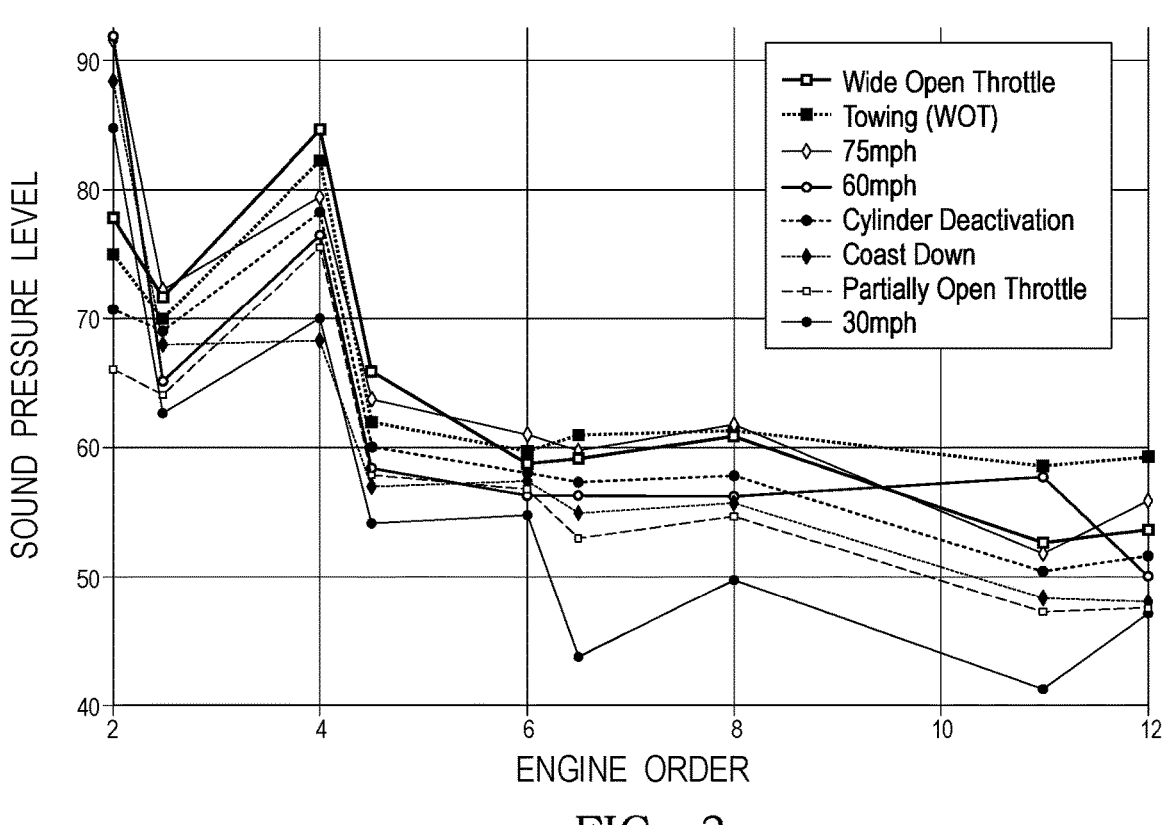
FIG. 3 is an exemplary graph showing the sound pressure level (SPL) versus engine order for several different vehicle drive modes.
FIG. 4 is a schematic block diagram representing an EOC system including a drive mode detector, in accordance with one or more embodiments of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

FIG. 1 shows an engine order cancellation (EOC) system 100 for a vehicle 102 having a noise signal generator 108. The noise signal generator 108 may generate reference noise signals X(n) corresponding to audible engine order noise for each engine order originating from a vehicle engine and exhaust system 110. The EOC system 100 may be integrated with a feed-forward and feedback active noise control (ANC) framework or system 104 that generates anti-noise by adaptive filtering of the noise signals X(n) from noise signal generator 108 using one or more microphones 112. An anti-noise signal Y(n) may then be played through one or more speakers 124. S(z) represents a transfer function between a single speaker 124 and a single microphone 112. While FIG. 1 shows a single noise signal generator 108, microphone 112, and speaker 124 for simplicity purposes only, it should be noted that typical EOC systems can include multiple engine order noise signal generators 108, in addition to multiple speakers 124 (e.g., 4 to 8), and microphones 112 (e.g., 4 to 6).

With reference to FIG. 2, the noise signal generator 108 may include an RPM sensor 242, which may provide an RPM signal 244 (e.g., a square-wave signal) indicative of rotation of an engine drive shaft or other rotating shaft indicative of the engine rotational speed. In some embodiments, the RPM signal 244 may be obtained from a vehicle network bus (not shown). As the radiated engine orders are directly proportional to the drive shaft RPM, the RPM signal 244 is representative of the frequencies produced by the drivetrain, including the engine and exhaust system. Thus, the signal from the RPM sensor 242 may be used to generate reference engine order signals corresponding to each of the engine orders for the vehicle. Accordingly, the RPM signal 244 may be used in conjunction with a lookup table 246 of RPM vs. Engine Order Frequency.

More specifically, the lookup table 246 may be used to convert the RPM signal 244 into one or more engine order frequencies. The frequency of a given engine order at the sensed RPM, as retrieved from the lookup table 246, may be supplied to an oscillator or frequency generator 248, thereby generating a sine wave at the given frequency. This sine wave represents a noise signal X(n) indicative of engine order noise for a given engine order. As there may be multiple engine orders, the EOC system 100 may include multiple noise signal generators 108 and/or frequency generators 248 for generating a noise signal X(n) for each engine order based on the RPM signal 244.

An engine rotating at a rate of 1800 RPM can be said to be running at 30 Hz (1800/60=30), which corresponds to the fundamental or primary engine order frequency. For a four-cylinder engine, two cylinders are fired during each crank revolution, resulting in the 60-Hz (30×2=60) dominant frequency that defines the four-cylinder engine's sound at 1800 RPM. In a four-cylinder engine, it's also called the "second engine order" because the frequency is two times that of the engine's rotational rate. At 1800 RPM, the other dominant engine orders of a four-cylinder engine are the $4^{th}$ order, at 120 Hz, and the $6^{th}$ order, at 180 Hz. In a six-cylinder engine, the firing frequency results in a dominant third engine order; in a V-10, it's the fifth engine order that is dominant. As the RPM increases, the firing frequency rises proportionally. As previously described, the EOC system 100 may include multiple noise signal generators 108 and/or frequency generators 248 for generating a noise signal X(n) for each engine order based on an RPM signal 244. Further, the ANC framework 104 (e.g., controllable filter 118, adaptive filter controller 120, secondary path filter 122) within the EOC system 100 may be scaled to reduce or cancel each of these multiple engine orders. For instance, an EOC system that reduces the $2^{nd}$, $4^{th}$, and $6^{th}$ engine orders requires three of the ANC frameworks or subsystems 104, one for each engine order. Certain system components such as the error microphones 112 and the anti-noise speakers 124 may be common to all systems or subsystems.

Referring back to FIG. 1, the characteristic frequencies of noise and vibrations that originate from the engine and exhaust system 110 may be sensed by one or more of the RPM sensors 242 optionally contained within the noise signal generator 108. The noise signal generator 108 may output a noise signal X(n), which is a signal that represents a particular engine order frequency. As previously described, noise signals X(n) are possible at different engine orders of interest. Moreover, these noise signals may be used separately or may be combined in various ways known by those skilled in the art. The noise signal X(n) may be filtered with a modeled transfer characteristic S'(z), which estimates the secondary path (i.e., the transfer function between an anti-noise speaker 124 and an error microphone 112), by a secondary path filter 122.

Drivetrain noise (e.g., engine, drive shaft, or exhaust noise) is transferred, mechanically and/or acoustically, into the passenger cabin and is received by the one or more microphones 112 inside the vehicle 102. The one or more microphones 112 may, for example, be located in a headrest 114 of a seat 116 as shown in FIG. 1. Alternatively, the one or more microphones 112 may be located in a headliner of the vehicle 102, or in some other suitable location to sense the acoustic noise field heard by occupants inside the vehicle 102. The engine, driveshaft and/or exhaust noise is transferred to the microphone 112 according to a transfer characteristic P(z), which represents the primary path (i.e., the transfer function between actual noise sources and an error microphone).

The microphones 112 may output an error signal e(n) representing the noise present in the cabin of the vehicle 102 as detected by the microphones 112. In the EOC system 100, an adaptive transfer characteristic W(z) of a controllable filter 118 may be controlled by adaptive filter controller 120. The adaptive filter controller 120 may operate according to a known least mean square (LMS) algorithm based on the error signal e(n) and the noise signal X(n), which is optionally filtered with the modeled transfer characteristic S'(z) by the filter 122. The controllable filter 118 is often referred to as a W-filter. The LMS adaptive filter controller 120 may provide a summed cross-spectrum configured to update the transfer characteristic W(z) filter coefficients based on the error signals e(n). The process of adapting or updating W(z) that results in improved noise cancellation is referred to as convergence. Convergence refers to the creation of W-filters that minimize the error signals e(n), which is controlled by a step size governing the rate of adaption for the given input signals. The step size is a scaling factor that dictates how fast the algorithm will converge to minimize e(n) by limiting the magnitude change of the W-filter coefficients based on each update of the controllable W-filter 118.

The anti-noise signal Y(n) may be generated by an adaptive filter formed by the controllable filter 118 and the adaptive filter controller 120 based on the identified transfer characteristic W(z) and the noise signal, or a combination of noise signals, X(n). The anti-noise signal Y(n) ideally has a waveform such that when played through the speaker 124, anti-noise is generated near the occupants' ears and the microphone 112 that is substantially opposite in phase and identical in magnitude to that of the engine order noise audible to the occupants of the vehicle cabin. The anti-noise from the speaker 124 may combine with engine order noise in the vehicle cabin near the microphone 112 resulting in a reduction of engine order noise-induced sound pressure levels (SPL) at this location. In certain embodiments, the EOC system 100 may receive sensor signals from other acoustic sensors in the passenger cabin, such as an acoustic energy sensor, an acoustic intensity sensor, or an acoustic particle velocity or acceleration sensor to generate error signal e(n).

Vehicles often have other shafts rotating at other rates relative to the engine RPM. For example, the driveshaft rotates at a rate related to the engine by the current gear ratio set by the transmission. A driveshaft may not have a perfect rotating balance, as it may have some degree of eccentricity. When rotated, the eccentricity gives rise to a rotating imbalance that imparts an oscillating force on the vehicle, and these vibrations may result in audible acoustic sound in the passenger cabin. Other rotating shafts that rotate at a rate different than the engine include the half shafts, or axels, that rotate at a rate set by the gear ratio in their differentials. In certain embodiments, the noise signal generator 108 can have an RPM sensor on a different rotating shaft, such as a drive shaft or half shafts.

While the vehicle 102 is under operation, a processor 128 may collect and optionally processes the data from the RPM sensor 242 in the noise signal generator 108 and the microphones 112 to construct a database or map containing data and/or parameters to be used by the vehicle 102. The data collected may be stored locally at a storage 130, or in the cloud, for future use by the vehicle 102. Examples of the types of data related to the EOC system 100 that may be useful to store locally at storage 130 include, but are not limited to, RPM history, microphone spectra or time dependent signals, microphone-based acoustic performance data, EOC tuning parameters and dominant engine orders based on drive mode, and the like. In addition, the processor 128 may analyze the RPM sensor and microphone data and extract key features to determine a set of parameters to be applied to the EOC system 100. The set of parameters may be selected when triggered by an event. In one or more embodiments, the processor 128 and storage 130 may be integrated with one or more EOC system controllers, such as the adaptive filter controller 120.

The simplified EOC system schematic depicted in FIG. 1 shows one secondary path, represented by S(z), between each speaker 124 and each microphone 112. As previously mentioned, EOC systems typically have multiple speakers, microphones and noise signal generators. Accordingly, a 6-speaker, 6-microphone EOC system will have 36 total secondary paths (i.e., 6×6). Correspondingly, the 6-speaker, 6-microphone EOC system may likewise have 36 S'(z) filters (i.e., secondary path filters 122), which estimate the transfer function for each secondary path. As shown in FIG. 1, an EOC system will also have one W(z) filter (i.e., controllable filter 118) between each noise signal X(n) from a noise signal generator 108 and each speaker 124. Accordingly, a 5-noise signal generator, 6-speaker EOC system may have 30 W(z) filters. Alternately, a 6-frequency generator 248, 6-speaker EOC system may have 36 W(z) filters.

As previously stated, EOC systems can be tuned starting with a single wide-open throttle (WOT) data recording session. The dominant engine orders are identified by looking at the sound recorded at the occupants' ears versus RPM. For each engine order, a single value for each of the main EOC algorithm parameters is typically identified. These EOC algorithm parameters typically include step size, stability SPL threshold, leakage, gain, and the like. As previously described, the step size is a scaling factor that dictates how fast the algorithm will converge to minimize the error signal e(n) by limiting the magnitude change of the W-filter coefficients based on each update of the controllable W-filters. In adaptive LMS filtering, leakage refers to a step in the W-filter update process. The W-filter adapts by adding to the previous W-filter a term based on the error signal and step size. When adding this update term, the previous W-filter can also be reduced by multiplying it by a term less than 1. Using leakage is the process of multiplying the previous W-filter magnitude by a coefficient less than one during adaptation. The stability SPL threshold refers to a threshold applied to an error microphone output signal (i.e., the error signal e(n)) above which the EOC system is deactivated, at least temporarily. Lastly, gain refers to an increase or decrease of the amplitude of the output of the frequency generator 248 or an any component within the noise signal generator 108 that results in an increase or decrease in the amplitude of X(n). In an alternate embodiment, gain could also refer to an increase or decrease in the amplitude of the anti-noise signal Y(n). In another alternate embodiment, gain could refer to an increase or decrease in the amplitude of the controllable filter 118. A possible benefit of adjusting the gain on the anti-noise signal Y(n), or on the noise signal X(n), based on the drive mode is to adapt more quickly to the new drive mode. For instance, when moving from a higher engine noise drive mode to a lower engine noise drive mode, decreasing the gain of the anti-noise signal Y(n) may aide the W-filters in adapting to the new, lower desired level of anti-noise faster than solely relying on the W-filter update process, which is gated by the step size.

A single value of each of these algorithm parameters for each engine order does not provide the optimal EOC experience for all vehicle driving scenarios (e.g. WOT versus constant speed driving). Further, the dominant engine orders during a WOT event are not always identical to the dominant orders during idle and other vehicle drive modes. One or more embodiments of the present disclosure is directed to selecting optimal set of EOC algorithm parameters based on a current vehicle operating condition or drive mode.

During a WOT event, the change in engine or other shaft RPM with time is high, and so the frequencies of the engine orders also change rapidly. In most cases, the WOT condition exhibits the highest interior noise levels due to a higher torque request compared to constant speed or partial open throttle drive scenarios. For EOC to maintain convergence (i.e., for the EOC system to continue to reduce engine order noise) when the engine order frequencies are rapidly changing or when the engine noise levels are high, a large step size is typically required. In order to maintain stability (i.e., to avoid divergence) with rapidly changing frequency using a relatively large step size, additional leakage should also be used.

However, when the vehicle is operated in steady state, the RPM is essentially constant and the sound character of the vehicle changes. In this case, step size may be reduced in order to improve noise cancellation because the LMS-based EOC system will converge more accurately to the minimum acoustic energy with a small step size. In addition, a small step size may be employed to reduce the audibility of "ANC wobble" or "ANC wander," where the LMS algorithm oscillates between several W-filters (magnitude and phase values) resulting in an audible and undesirable fluctuation in cancellation level. Further, this small step size does not require a high leakage value to maintain stability. Therefore, leakage can be reduced or eliminated to further improve EOC cancellation depth, making the vehicle interior even quieter. Accordingly, aggressive leakage and step size may provide the best EOC during a WOT, while non-aggressive leakage and step size may provide the best EOC during steady state.

Any single set of EOC tuning parameters will naturally result in compromised noise cancellation performance or stability during all driving conditions. Employing drive scenario dependent EOC parameters may also ease certain EOC tunings. For example, a known corner case is divergence of an EOC algorithm after the vehicle is operated for a prolonged period at highway speed (i.e., steady state RPM). By providing a separate set of tuning parameters for this drive mode, no compromise is necessary, and divergence avoidance or stability, will be improved.

There are more driving scenarios possible than just WOT and constant speed. Intermediate values of the tuning parameters may be possible for intermediate or partial open throttle (POT) positions. The drive mode can be detected and labeled by monitoring the time history of RPM, speed, and torque, with possible additional inputs from the vehicle Controller Area Network (CAN) bus, or from other systems. Nonlimiting examples of various drive modes that may be detected and labeled may include: WOT, Towing, Steady State at various speeds (e.g., 75 mph, 60 mph, and 30 mph), Cylinder Deactivation, Coast Down, Partially Open Throttle (POT), Idle, and the like. FIG. 3 is a graph showing the SPL in the passenger cabin versus engine order for several of the above-mentioned drive modes to demonstrate the impact of drive mode on engine order noise in the passenger cabin.

In addition to monitoring the time history of RPM, speed, and torque, monitoring cruise control engagement or the transmission gear state are other possible ways to identify the vehicle drive mode. For example, the WOT (Wide Open Throttle) condition can be detected by rate of change of RPM, sudden downshift of multiple gears, rate of fuel flow into the engine (cylinders), rate of change of vehicle speed, pedal position, rate of change of torque output of the engine, value of vehicle acceleration, or the like. The POT (Partially Open Throttle) condition is a lower threshold of the same quantities listed above for WOT.

Towing may be detected by an elevated engine torque at every RPM relative to "normal driving." For instance, a range of engine output torque may be stored for "normal driving." If the torque exceeds this range of values, then the "towing" mode may be identified. Though not specifically referenced, an "incline driving" mode (e.g., for when driving up a mountain) is similar to the towing mode in both detection method and in ideal EOC parameter selection. The two modes could be distinguished with the input from an angular position sensor, indicating the angle of the vehicle relative to horizontal, for example.

The Constant Speed drive mode may be detected by zero or negligible rate of change of RPM during a particular time duration. Cylinder Deactivation may be detected by a CAN message or by the acoustic detection of different engine orders. For example, when an 8-cylinder engine deactivates 2 cylinders, it radiates the engine orders of a 6-cylinder engine (i.e., 3rd, 6th and 9th engine order), rather than the 2nd, 4th, and 6th engine orders radiated by 8-cylinder engines. The Coast Down drive mode may be detected by a negative rate of change of RPM or by application of the brakes within a certain force tolerance.

The Idle condition can be identified by the engine operating at a constant speed between the cold idle RPM and the warm idle RPM. An alternate or aiding identification method is to simply detect that the vehicle's engine is on, but the vehicle speed is substantially zero. The transmission gear state may also aide identification of idle, however, the gear state may be either park or drive at idle.

FIG. 4 is schematic block diagrams representing an EOC system 400, in accordance with one or more embodiments of the present disclosure. The EOC system 400 may be a Filtered-X Least Mean Squares (FX-LMS) EOC system, as understood by those of ordinary skill in the art. Similar to EOC system 100, the EOC system 400 may include elements 408, 410, 412, 418, 420, 422, and 424, consistent with operation of elements 108, 110, 112, 118, 120, 122, and 124, respectively, discussed above. FIG. 4 also shows the primary path P(z) and secondary path S(z), as described with respect to FIG. 1. Because engine order noise is narrow band, the error microphone signal e(n) may be filtered by a bandpass filter 450 prior to passing into the LMS-based adaptive filter controller 420. In an embodiment, the noise signal X(n) output by the noise signal generator 408 is bandpass filtered using the same bandpass filter parameters. Because the frequency of the various engine orders differs, each engine order may have its own bandpass filters having different high- and low-pass filter corner frequencies. The number of frequency generators and corresponding noise-cancellation components will ultimately vary based on the number of engine orders desired to be reduced in level for a particular vehicle.

To detect the vehicle drive mode, the EOC system 400 may further include a drive mode detector 462. The drive mode detector 462 may include a processor and memory (not shown), such as processor 128 and storage 130, programmed to identify and label various driving modes or scenarios, such as those previously described. Again, this drive mode detection may involve monitoring the time history of RPM, speed and torque, cruise control engagement, transmission gear state, and the like. The drive mode detector 462 may be a dedicated controller for detecting vehicle drive modes or may be integrated with another controller or processor in the EOC system 400, such as the LMS adaptive filter controller 420. Alternatively, drive mode detector 462 may be integrated into another controller or processor within vehicle 102 that is separate from the other components in the EOC system.

The drive mode detection scheme can result in the identification of a particular drive mode after any period of analysis of the guiding signals. For instance, a drive mode may be identified after only 10 milliseconds of data being analyzed and improved detection may occur after 100 milliseconds. Moreover, the drive mode detection may be employed on a continuous basis at regular time intervals and/or in response to a certain event. Such events may include but are not limited to the receipt of a CAN message, an input identifying the engaging of cruise control, an input identifying the transmission state has changed from drive to park, the receipt of a signal indicating that accelerator pedal is fully depressed, or the like.

Figures 5, 6:
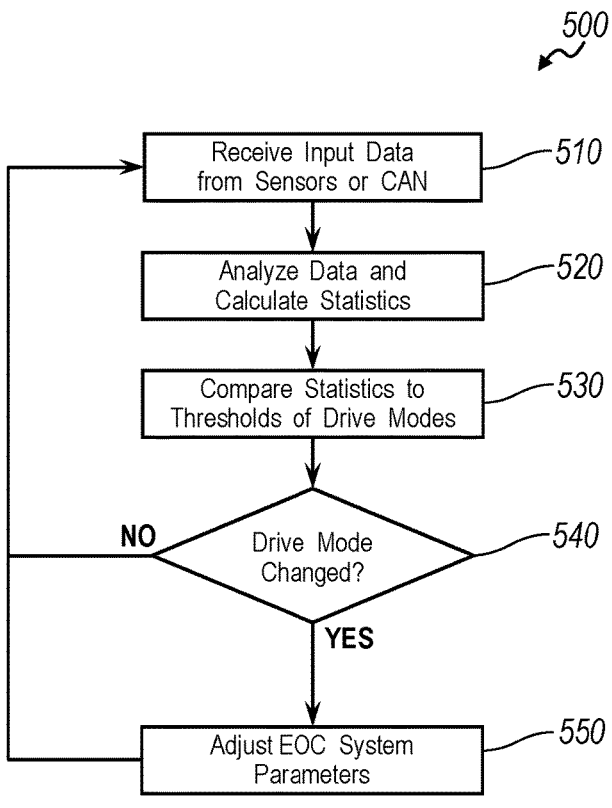
FIG. 5 is an exemplary flowchart depicting a method for optimizing EOC tuning parameters based on vehicle drive mode, in accordance with one or more embodiments of the present disclosure.
FIG. 6 is an exemplary table illustrating EOC tuning parameters that may be applied for a given driving mode or scenario, in accordance with one or more embodiments of the present disclosure.

FIG. 5 is an exemplary flowchart depicting a method 500 for optimizing EOC tuning parameters based on vehicle drive mode, in accordance with one or more embodiments of the present disclosure. Sensor data, including types listed above, may be acquired at step 510. For instance, the system may monitor or receive signals indicative of vehicle operating conditions. As set foth above, this may involve monitoring the time history of RPM, speed and torque, pedal position, fuel flow rate, as well as signals indicative of cruise control engagement, transmission gear state, and the like. At step 520, the data may be analyzed and statistics computed. For example, the drive mode detector 462 or another controller may compute a rate of change of RPM, a rate of change of vehicle speed, or a rate of change of torque output of the engine. At step 530, the resulting statistics may be compared to predetermined thresholds related to speed, pedal position, torque, and the like. For instance, a rate of change of RPM, speed, or torque between a first, lower threshold and a second upper threshold may be indicative of a POT drive mode, while a rate of change above the second, upper threshold may be indicative of a WOT drive mode. Moreover, CAN messages may be optionally received and compared to a list of those that identify a particular drive mode.

The drive mode detector 462 may determine whether a change in drive mode has occurred, as provided at step 540. If the drive mode has not changed, no parameter changes are necessary and new sensor data may be acquired at step 510 as shown. However, if a new drive mode is detected at step 540, the drive mode detector 462 may transmit a signal 466 indicative of the current drive mode or scenario to the adaptive filter controller 420. In response to signal 466, the adaptive filter controller 420 may modify one or more of the LMS algorithm parameters, as provided at step 550. For example, the step size and leakage can be adjusted to appropriate values depending on the vehicle's current rate of change of RPM.

FIG. 6 is an exemplary table 600 illustrating EOC tuning parameters relative to each driving scenario. The four main tuning parameters previously described may be intelligently adjusted based on the drive mode to maximize EOC system performance. As shown, each tuning parameter may be assigned a discrete state (e.g., High/Low or High/Medium/Low) based on the detected drive mode. For each tuning parameter, a corresponding value associated with each state may be applied in the EOC algorithm by the adaptive filter controller 420. Alternatively, the table 600 may include specific numerical values for each tuning parameter to further optimize EOC based on various drive modes. These specific numerical values may be predetermined and may be stored in memory 130. For example, when moving from a low to a medium step size drive mode, the step size may be increased by a predetermined amount, such as 10 dB or 20 dB. When returning to a low step size from a medium step size drive mode, the step size may be decremented by a predetermined amount, such as 10 or 20 dB. In an embodiment, when moving from a high to a low leakage drive mode, the leakage value may be decreased by a predetermined amount, such 50% or 73%. In another embodiment, when moving from a high to a low Stability SPL threshold, the SPL threshold may be reduced by a predetermined amount such as 10 dB.

In one or more embodiments, when a new drive mode (or gear shift) is identified (i.e., a change in drive modes is detected), the step size may be initially increased for a short duration to decrease adaptation time in this new drive mode. Following this short duration, the main tuning parameters (including step size) can be adjusted in accordance with the table 600 in FIG. 6 based on the specific drive mode detected.

In addition to changing EOC tuning parameters, engine order noise from the dominant engine orders may be reduced based on the drive and/or transmission mode. Due to processing power and other EOC system limitations, the EOC system 400 and its corresponding algorithm may be limited in the number of engine order noise amplitudes that may be reduced. The number of machine code instructions a computer can process while executing a "standard" program is measured in MIPS (Million Instructions Per Second). Thus, for example, for a given MIPS and memory limit, an EOC algorithm may only be able to reduce the amplitude of five engine orders. Cancellation of more engine orders would require additional digital signal processing (DSP) resources, which may not be available or desirable. However, the five dominant engine orders may differ in different drive or transmission modes.

Figures 7, 8:
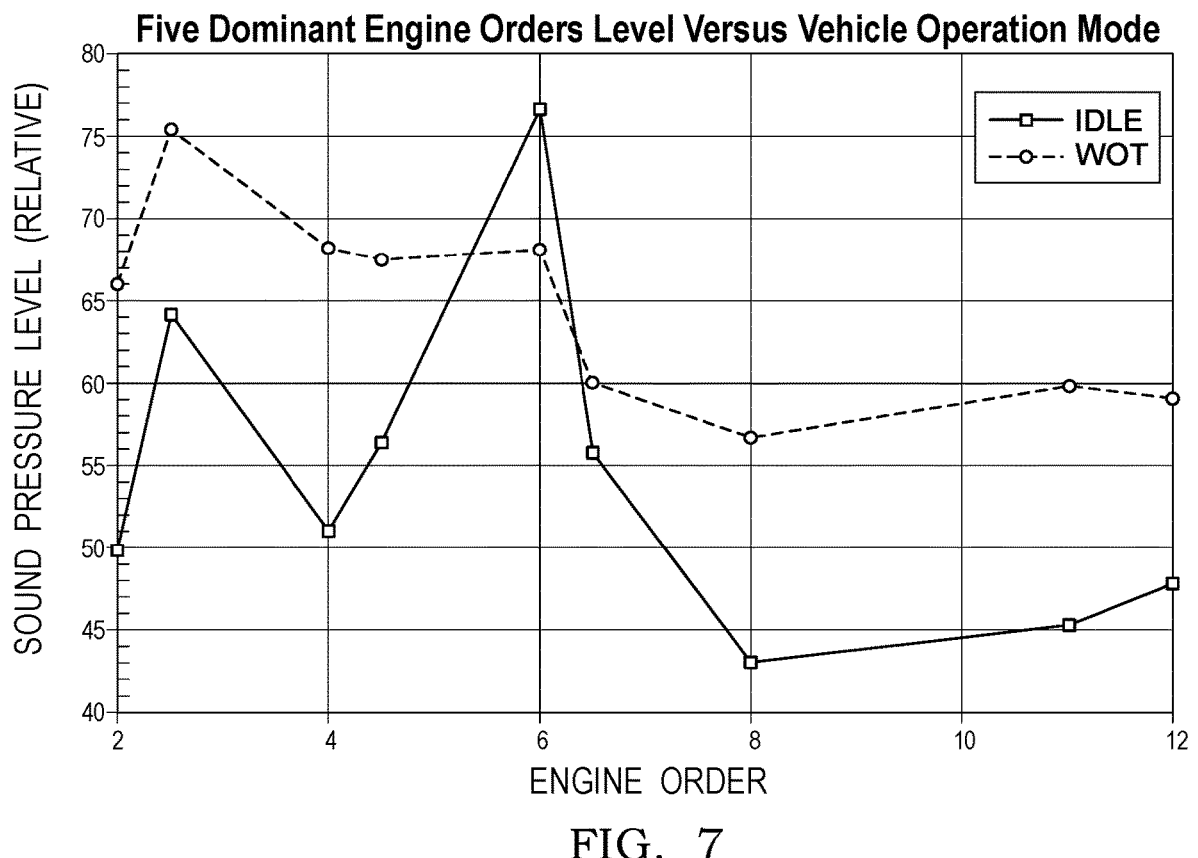
FIG. 7 is an exemplary plot showing the relative SPL versus engine order measured for a vehicle in two different drive modes.
FIG. 8 is an exemplary table illustrating dominant engine orders for a given driving mode or scenario that may be targeted for EOC, in accordance with one or more embodiments of the present disclosure.

Transmission modes can include, but are not limited to, Sport, Economy (ECO), Snow, Tow, Baja, Rock, and Track. The transmission mode changes the torque request and gearshift points on the engine, thereby changing the engine order levels. FIG. 7 is an exemplary plot showing the relative SPL versus engine order measured in one vehicle in two drive modes. Measurements in the first drive mode were taken while the vehicle was stationary with the engine at warm idle speed. Measurements in the second drive mode were taken during a WOT. As shown in FIG. 7, the five dominant engine orders are different in these two vehicle drive modes. Further, even the single most dominant engine order differs between these two drive modes. Two of the 5 most dominant engine orders differ by more than 15 dB between these two drive modes.

Thus, to optimize EOC, without dedicating DSP resources to cancel all engine orders, the EOC system 400 and corresponding algorithm may target the dominant engine orders in each drive mode, rather than just the dominant engine orders at WOT. If the EOC system can target five engine orders to noise cancellation, then the algorithm may select the five most dominant engine orders to target based on the drive or transmission mode. An added benefit of using gear or transmission state to identify the vehicle drive mode is related to driveline cancellation. As is generally understood, certain acoustic sounds in the passenger cabin originate from the vibrations induced by the rotating imbalance of the drive shaft. For each transmission gear, the drive shaft RPM is related by a different factor (due to the different gear ratios) to the engine RPM. Therefore, for each gear, a different set of RPM-to-frequency lookup tables are required for the EOC algorithm to cancel driveline induced noise in the vehicle. Similarly, for each drive state, a different set of RPM-to-frequency lookup tables may be employed so the EOC algorithm targets the dominant engine orders in each drive mode.

In view of the foregoing, identification of a drive mode may not only result in loading the ideal adaptation parameters that results in optimal noise cancellation of the particular engine orders, but may also result in loading a list of the dominant engine orders for that particular new drive mode. Similar to FIG. 6, FIG. 8 is an exemplary table 800 illustrating dominant engine orders for a particular engine relative to each driving scenario. This will result in overall lower total noise floor in the vehicle, thereby further optimizing the noise cancellation performance experienced by the vehicle occupants.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Although FIGS. 1 and 4 show LMS-based adaptive filter controllers 120 and 420, respectively, other methods and devices to adapt or create optimal controllable W-filters 118 and 418 are possible. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers.

Those of ordinary skill in the art understand that functionally equivalent processing steps can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

What is claimed is:

1. A method for dynamically tuning an engine order cancellation (EOC) system based on vehicle drive mode, the method comprising:

storing a set of EOC tuning parameters for each of a plurality of vehicle drive modes in memory, each set of EOC tuning parameters differing between vehicle drive modes and being configured to tune an output of a speaker to cancel a noise, wherein the plurality of vehicle drive modes includes at least one of a partially open throttle drive mode, a constant speed drive mode, a wide open throttle drive mode, a towing mode, and an incline driving mode;

applying a first set of EOC tuning parameters corresponding to a current vehicle drive mode;

receiving at least one signal indicative of vehicle operating conditions;

detecting a change in the current vehicle drive mode based on the at least one signal; and applying a second set of EOC tuning parameters in response to the change in the current vehicle drive mode.

2. The method of claim 1, wherein:

applying the first set of EOC tuning parameters corresponding to the current vehicle drive mode comprises:

selecting the first set of EOC tuning parameters corresponding to a first vehicle drive mode from memory when the first vehicle drive mode is the current vehicle drive mode; and employing the first set of EOC tuning parameters during EOC; and applying the second set of EOC tuning parameters in response to the change in current vehicle drive mode comprises:

selecting the second set of EOC tuning parameters corresponding to a second vehicle drive mode from memory in response to the change in current vehicle drive mode from the first vehicle drive mode to the second vehicle drive mode; and employing the second set of EOC tuning parameters during EOC when the current vehicle drive is the second vehicle drive mode.

3. The method of claim 1, wherein the set of EOC tuning parameters for each of the plurality of vehicle drive modes includes at least a step size.

4. The method of claim 1, wherein the set of EOC tuning parameters for each of the plurality of vehicle drive modes includes at least a leakage value.

5. The method of claim 1, wherein the set of EOC tuning parameters for each of the plurality of vehicle drive modes includes at least a gain applied to one of an anti-noise signal and a noise signal.

6. The method of claim 1, wherein the set of EOC tuning parameters for each of the plurality of vehicle drive modes includes at least a sound pressure level threshold applied to an error signal.

7. The method of claim 1, wherein the at least one signal is further indicative of at least one of revolutions per minute (RPM), speed, and torque.

8. The method of claim 7, wherein detecting the change in the current vehicle drive mode based on the at least one signal comprises:

determining a rate of change of at least one of RPM, speed, and torque; and comparing the rate of change to one or more predetermined thresholds.

9. The method of claim 1, wherein the plurality of vehicle drive modes includes the partially open throttle drive mode and the constant speed drive mode.

10. The method of claim 1, wherein the plurality of vehicle drive modes includes the wide open throttle drive mode.

11. An engine order cancellation (EOC) system comprising:

at least one controllable filter configured to generate an anti-noise signal based on an adaptive transfer characteristic and a noise signal received from a noise signal generator, the adaptive transfer characteristic of the at least one controllable filter characterized by a set of filter coefficients;

an adaptive filter controller, including a processor and memory, programmed to:

store a set of EOC tuning parameters for each of a plurality of vehicle drive modes, each set of EOC tuning parameters differing between vehicle drive modes;

apply the set of EOC tuning parameters corresponding to a current vehicle drive mode; and adapt the set of filter coefficients based on the noise signal and an error signal received from a microphone located in a cabin of a vehicle; and a drive mode detector in communication with at least the adaptive filter controller, the drive mode detector including a processor and memory programmed to:

receive at least one signal indicative of vehicle operating conditions, wherein the at least one signal indicative of vehicle operating conditions is indicative of transmission gear state;

analyze the at least one signal to determine the current vehicle drive mode; and transmit a drive mode signal indicative of the current vehicle drive mode to the adaptive filter controller.

12. The system of claim 11, wherein the drive mode detector transmits the drive mode signal in response to detecting a change in the current vehicle drive mode.

13. The system of claim 11, wherein the set of EOC tuning parameters for each of the plurality of vehicle drive modes includes at least one of a step size and a leakage value.

14. The system of claim 11, wherein the plurality of vehicle drive modes includes at least a partially open throttle drive mode and a constant speed drive mode.

15. The system of claim 11, wherein the at least one signal indicative of vehicle operating conditions is indicative of at least one of revolutions per minute (RPM), speed, and torque.

16. A method for dynamically targeting dominant engine orders for active noise cancellation in an engine order cancellation (EOC) system based on vehicle drive mode, the method comprising:

storing a set of dominant engine orders for each of a plurality of vehicle drive modes, each set of dominant engine orders differing between vehicle drive modes, wherein each of the plurality of vehicle drive modes corresponds to a different state of a vehicle transmission;

receiving at least one signal indicative of vehicle operating conditions;

detecting a current vehicle drive mode based on the at least one signal;

selecting the set of dominant engine orders corresponding to the current vehicle drive mode; and applying noise cancellation to each engine order in the set of dominant engine orders corresponding to the current vehicle drive mode.

17. The method of claim 16, further comprising selecting a different set of dominant engine orders in response to detecting a change in the current vehicle drive mode.

18. The method of claim 1, wherein the plurality of vehicle drive modes further includes at least a cylinder deactivation mode.

19. The system of claim 11, wherein the plurality of vehicle drive modes includes at least one of a wide open throttle drive mode and a cylinder deactivation mode.

20. The method of claim 16, wherein the plurality of vehicle drive modes includes at least one of a partially open throttle drive mode, a constant speed drive mode, a wide open throttle drive mode, and a cylinder deactivation mode.

21. The method of claim 1, wherein the at least one signal is indicative of cruise control engagement.

* * * * *